(12) United States Patent
Graham et al.

(10) Patent No.: US 8,843,622 B1
(45) Date of Patent: Sep. 23, 2014

(54) SYSTEM AND METHOD TO CONTACT AND MAINTAIN STATUS OF MANAGED DEVICES

(75) Inventors: Mickael Graham, Bellevue Hill (AU); Anton Okmyanskiy, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 98 days.

(21) Appl. No.: 13/329,638

(22) Filed: Dec. 19, 2011

(51) Int. Cl.
*G06F 15/16* (2006.01)
(52) U.S. Cl.
USPC .......................... 709/224; 709/206; 370/241
(58) Field of Classification Search
USPC ......................................................... 709/224
See application file for complete search history.

(56) References Cited

U.S. PATENT DOCUMENTS

| | | | |
|---|---|---|---|
| 8,375,121 B2 * | 2/2013 | Ziegler et al. | 709/224 |
| 2006/0230143 A1 * | 10/2006 | Ziegler et al. | 709/224 |
| 2007/0002755 A1 * | 1/2007 | Matityahu et al. | 370/242 |
| 2007/0286092 A1 * | 12/2007 | Famolari et al. | 370/252 |
| 2008/0049627 A1 * | 2/2008 | Nordin | 370/241 |
| 2010/0217809 A1 * | 8/2010 | Vymenets et al. | 709/206 |
| 2012/0054326 A1 * | 3/2012 | Royon et al. | 709/223 |
| 2012/0163797 A1 * | 6/2012 | Wang | 398/2 |
| 2012/0254407 A1 * | 10/2012 | Li et al. | 709/224 |
| 2013/0018632 A1 * | 1/2013 | Field et al. | 702/183 |
| 2013/0145005 A1 * | 6/2013 | Sunderrajan | 709/223 |
| 2013/0150050 A1 * | 6/2013 | Ueda et al. | 455/436 |
| 2013/0151893 A1 * | 6/2013 | Gorecha et al. | 714/15 |

OTHER PUBLICATIONS

The Broadband Forum, Proposed Draft, "PD-268 TR-069 Annex G Alternative," Revision: 04; Revision Date: Dec. 2011, 17 pages.
J. Rosenberg, et al., "Session Traversal Utilities for NaT (STUN)," Network Working Group, RFC 5389, Oct. 2008, 52 pages.
C. Jennings, et al., "Managing Client-Initiated Connections," Network Working Group, RFC 5626, Oct. 2009, 51 pages.
John Blackford, "TR-069 Annex G (STUN) Alternative," Nov. 2010, 4 pages.
Digdon, Mike, "Project PD-268: RFC 5389 (STUN) Case Study," Broadband Home Technical Working Group; May 2011, 9 pages.
Blackford, John, "XMPP Case Study," Broadband Home Technical Working Group; Feb. 2011, 5 pages.
Blackford, John, "Project PD-268: Addressing Concerns from bbf2011.301," BroadbandHome Technical Working Group; May 2011, 3 pages.
Nicolai, Steve, et al., "Project PD-268: Analysis of Gateway proxy and UPnP proposals," May 10, 2011; Broadband Forum; 4 pages.
Carey, Tim "Project PD-268: TR-069 Annex G 'Connection Request via NAT Gateway' Evaluation Criteria Results Compilation Format," BroadbandHome Technical Working Group, Oct. 2011, 2 pages.
Carey, Tim "Project PD-268: TR-069 Annex G 'Connection Request via Nat Gateway' Evaluation for XMPP," BroadbandHome Technical Working Group, Dec. 2011, 2 pages.

* cited by examiner

*Primary Examiner* — Hamza Algibhah
(74) *Attorney, Agent, or Firm* — Patent Capital Group

(57) ABSTRACT

A method is provided in one example and includes establishing a plurality of persistent connections with a plurality of devices at a server; receiving presence data associated with the plurality of devices; responding to heartbeat messages provided by the plurality of devices; receiving a status change notification from a particular one of the devices; and updating status data and heartbeat data for the particular one of the devices. In more particular embodiments, the method includes encoding messages communicated on the persistent connections using an extensible messaging and presence protocol (XMPP). The method may also include communicating script configuration data over a particular one of the persistent connections for execution by the particular device. The persistent connections may be secured using transport layer security (TLS).

20 Claims, 8 Drawing Sheets

SYSTEM AND METHOD TO CONTACT AND MAINTAIN STATUS OF MANAGED DEVICES

TECHNICAL FIELD

This disclosure relates in general to the field of communications and, more particularly, to contacting and maintaining status of managed devices.

BACKGROUND

End users have more media and communications choices than ever before. A number of prominent technological trends are currently afoot (e.g., more computing devices, more online video services, more Internet video traffic), and these trends are changing the content delivery landscape. Separately, these trends are pushing the limits of capacity and, further, degrading the performance of data delivery, where such degradation creates frustration amongst end users, content providers, and service providers. In many instances, the data sought for delivery is dropped, fragmented, delayed, or simply unavailable to certain end users. Hence, there is a challenge in providing an appropriate solution for these problematic network scenarios.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes establishing a plurality of persistent connections with a plurality of devices at a server. The connections can be transmission control protocol (TCP) connections, or any other suitable link, session, flow, etc. The method may also include receiving presence data associated with the plurality of devices. The presence data can include any suitable data associated with an individual device (e.g., a customer premise equipment (CPE). The method also includes responding to heartbeat messages provided by the plurality of devices; receiving a status change notification from a particular one of the devices; and updating status data and heartbeat data for the particular one of the devices. The status data can include any type of indicator about the current condition of the particular connection (functional, dysfunctional, active, non-active, dormant, no traffic present, etc.). In more particular embodiments, the method includes encoding messages communicated on the persistent connections using an extensible messaging and presence protocol (XMPP).

The method may also include communicating script configuration data over a particular one of the persistent connections for execution by the particular device. The persistent connections may be secured using transport layer security (TLS). In addition, the method may include communicating a status for the particular device from the server in response to a request status update from a user interface. Additionally, an alarm may be communicated from the server when a status change notification satisfies a condition or the heartbeat message is not received after a predetermined amount of time.

The method may also include consulting a redundant server before an alarm is communicated when a heartbeat message is not received from the particular device after a predetermined amount of time. The presence data may include any suitable information such as a preconfigured list of parameters about a particular set of services for the particular device. The method may also include caching the presence data in memory for access by an operations support system (OSS) (i.e., a computer system). The server can expose an application program interface (API) to allow an OSS access to a particular one of the persistent connections with the particular device for the purpose of providing script configuration data. The method may also include determining a threshold of the plurality of devices have lost connectivity; and providing an alarm to indicate a condition reflective of the lost connectivity.

Example Embodiments

Figure 1:
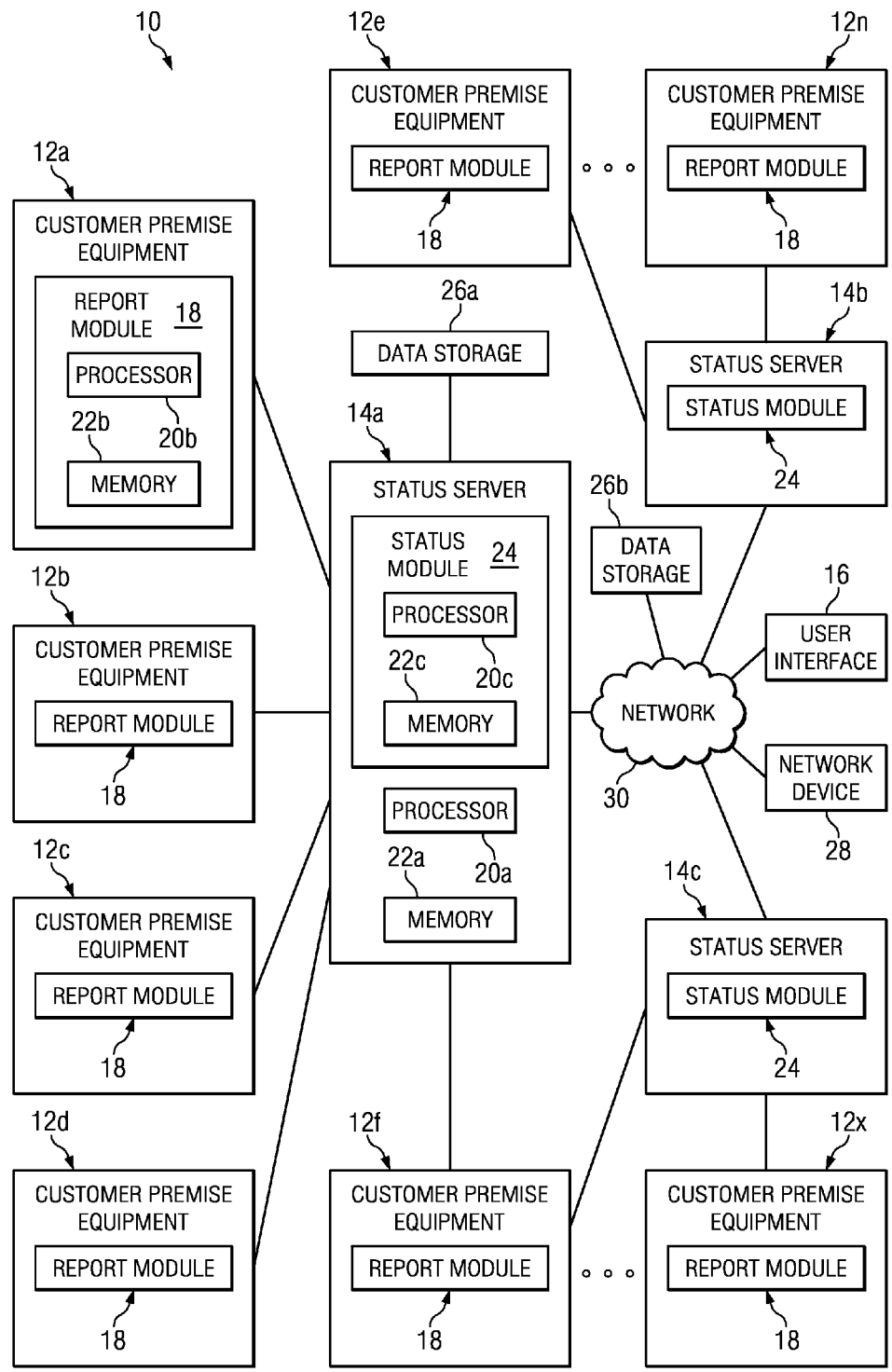
FIG. 1 is a simplified block diagram of a communication system to contact and maintain status of managed devices in accordance with one embodiment of the present disclosure.

Turning to FIG. 1, FIG. 1 is a simplified block diagram of a communication system 10 to contact and maintain status of managed devices in accordance with one embodiment of the present disclosure. FIG. 1 includes a plurality of instances of customer premise equipment (CPE) 12*a-f* (where 12*n* and 12*x* represent an unknown number), a plurality of status servers 14*a-c*, a user interface 16, a set of data storage elements 26*a* and 26*b* (e.g., log files), and a network device 28. CPEs 12*a-f* may each contain an instance of a report module 18. Report module 18 may include (or otherwise interface with) a processor 20*b* and a memory 22*b*. Status servers 14*a-c* may contain a processor 20*a*, a memory 22*a*, and a status module 24. Status module 24 may include a processor 20*c* and a memory 22*c*. Status servers 14*a-c* are configured to collect data (e.g., data regarding status) of CPEs 12*a-f* and, when requested, report the information to user interface 16, network device 28, or any other suitable location.

Status servers 14*a-c* may also communicate an alarm (e.g., a signal) to user interface 16 (or network device 28) based on data from CPEs 12*a-f*. For example, if network device 28 is a security monitoring center and CPE 12*a* is a surveillance system for a building and, further, if the connection to CPE 12*a* is lost, then an alarm may be sent to network device 28. In another example, an alarm may be sent to user interface 16 if CPEs associated with a status server lose connection(s). For example, if CPEs 12a-f were to lose their connection to status server 14a, then an alarm may be sent to user interface 16 to signal the condition.

Report module 18 is configured to determine if the status of a CPE has changed. In certain embodiments, once a change is detected, report module 18 can subsequently communicate the change to status module 24 in the corresponding status server, which is associated with the CPE that changed. For example, if the status of CPE 12a changed, then report module 18 can report the change to status server 14a. Status servers 14a-c store the status of each CPE 12a-f for which they have responsibility. When user interface 16 or network device 28 requests the status of one or more CPEs 12a-f, status servers 14a-c can quickly respond to the request. A history of status changes or connectivity heartbeats for each CPE, or other system information (e.g., scripts sent to CPEs, history of outages, etc.) may be stored in data storage 26a and/or 26b (e.g., log files).

For purposes of illustrating certain example techniques of communication system 10, it is important to understand how typical communications may traverse the network. The following foundational information may be viewed as a basis from which the present disclosure may be properly explained.

TR-069 is a remote management protocol defined by the Broadband Forum. Millions of deployed CPEs support this protocol. While TR-069 has a number of benefits, a number of issues exist relating to retrieving up-to-date status from the deployed CPEs, useful alarming based on groups of CPEs, and requesting a TR-069 session for CPEs behind a network address translation (NAT). One drawback of using TR-069 is that TR-069 is not conducive to real-time status monitoring. The design of TR-069 causes a CPE to create an expensive secure sockets layer (SSL) connection to an auto configuration server (ACS) each time a change of value occurs (e.g., radio is up, IP address has changed, etc.), or any time data needs to be retrieved from the CPE. Such a design does not scale well for millions of CPEs because the SSL connection is relatively short-lived, and the creation of multiple SSL connections can be expensive.

TR-069 also does not provide real-time status of all CPEs in real-time because TR-069 has no mechanism to provide the data quickly. For example, in a Femtocell deployment, the service provider may wish to know the number of CPEs that have their radio enabled (which can be highly desired by service providers (SPs)). Querying each CPE to identify this information would be overly expensive and time consuming due to on-demand connection setup overhead.

In addition, TR-069 also does not lend itself to efficient alarming for large TR-069 CPE populations. If a CPE loses connectivity, the ACS would not know of this condition because the CPE would have to report it to the ACS, and a lack of connectivity would prohibit the CPE from reporting the issue. In another example, if a mass of alarms is triggered (such as the case of a regional service failure), the mass of alarms may cause a flood of alarms to the server and result in significant overhead of connection setups. Having the ability to trigger an alarm when a threshold of CPEs have experienced a given error is highly desirable: especially if such events can be easily correlated (i.e., ISP outage in a given area because CPEs have dropped offline). Before alarms can even be correlated, a more scalable mechanism would be required to understand the status of the CPEs.

Further, in TR-069, the client (i.e., the CPE) is the one to establish the management session with the server (e.g., ACS). When the server seeks to manage a CPE, it can request the CPE to establish a session. This request process is called a connection request (CR). The CR relies on the CPE having a routable IP address, which the server can reach. It is rather common for CPEs to be deployed behind NAT architectures, which makes the traditional connection request unworkable. In many cases, CPEs deployed in the field can enter into a state where some external process or script (running on the CPE) is needed to correct its behavior. Typically, CPEs have a secure shell (SSH) backdoor, which is highly inefficient when dealing with millions of CPEs. A scalable and secure backdoor may be needed to prevent bricking the CPEs (i.e., rendering the CPEs dysfunctional). Attempts in the Broadband Forum have been made to address the issue; however, current solutions are not scalable, nor are they reliable.

In accordance with one example implementation, communication system 10 can resolve the aforementioned issues (and potentially others) associated with contacting and maintaining a status of managed devices. More specifically, communication system 10 is configured for utilization with a long-lived transmission control protocol (TCP) connection between the CPE (e.g., CPEs 12a-f) and a "heartbeat" server (e.g., status server 14a-c). The connection can be secured using transport layer security (TLS). The use of a persistent TCP connection eliminates issues with NAT that prevent the server from reaching the CPE. Messages sent on the TCP connection may be encoded using an extensible messaging and presence protocol (XMPP) with a payload specific to a protocol. XMPP is essentially an instant messaging protocol that can enable parties to send messages in both directions. Requests may be initiated by either party with the appropriate response being sent.

In an embodiment, the following XMPP messages/content (syntax and XSD) may be supported: stream, features, auth, success, failure, conflict, bind, presence, error, iq, etc. A CPE's XMPP address (comprised of the localpart@domainpart) may have its localpart as its identifier from a CN field in the CPE's certificate. The domainpart can be taken from the status server that is associated with the CPE (i.e., a URL (host portion), unless the CPE is configured with a non-empty value. In an embodiment, the domainpart is configurable (e.g., via TR-069). The status server's XMPP address can be the host portion from its URL.

A stream open message from both the CPE and the status server can include a status server namespace, which indicates the version of the protocol (e.g., 1.0) and, therefore, indicates how the message payload is to be interpreted. Each top level element that is specific to the status server (e.g., CMHSStatus) can also include a status server namespace to indicate the version of the protocol (e.g., 1.0) and, therefore, indicate how the message payload is to be interpreted. Status server related XML may be encoded using the namespace (e.g., version 1.0) used in the XMPP stream open exchange. The unknown XMPP and status server XML attributes and elements may be ignored.

Each CPE and status server can open a single XMPP stream on a TCP connection. Once a XMPP stream is established, the CPE and status server are allowed to have (at most) one request message outstanding to each other. If the status server detects a second connection from the CPE, it can accept the connection and close the first connection (e.g., gracefully by sending a conflict element) and only use the second (new) connection. This situation may occur if the CPE believes the connection has been terminated, but the status server has not detected the termination. A connection can be identified by the CPE's XMPP address and its resource binding (e.g., '00223A-0000399729@mso.com/wan).

In a specific embodiment, the status server XMPP stream setup may deviate from the standard XMPP stream setup because TLS is already established with the CPE and the status server authentication has already been performed. In addition, a CPE certificate may not contain an XmppAddr identifier, as the CN field is used. The XMPP stream setup process occurs after the TLS connection has been successfully established and authenticated and no other messages are sent until the stream setup is complete.

After the connection has been established and the TLS authentication has been performed (client and server certificate), the CPE opens the XMPP stream. The status server responds by opening the XMPP stream in the opposite direction. The CPE now sends its presence (status) message. This includes a preconfigured list of parameters about CPE services. The status server caches this data in memory for access (e.g., access by SP's operations support system (OSS)). The OSS may include any suitable computer systems, network systems, etc. configured to deal with telecommunications networks: supporting processes such as maintaining network inventory, provisioning services, configuring network components, managing faults, etc.

The CPE can also send a presence message update after a change of parameter values was detected, or when script execution is completed. If no traffic has been detected on the connection by the CPE after a predetermined amount of time (e.g., ninety-five (95) to one hundred and twenty (120) seconds), the CPE can send a heartbeat message to maintain the connection. The status server can then echo the heartbeat message. This is the XMPP ping message exchange and it keeps the connection alive through the NAT devices and, further, allows both parties access to each other. It also allows the status server to keep track of missed heartbeats, thus gaining insight to the CPE potentially being offline (powered down). The exact interval of one heartbeat to the next heartbeat may be randomly selected by the CPE. In an embodiment, only an upper limit (e.g., one hundred and twenty (120) seconds) of the heartbeat interval is configured on the CPE, where a lower limit (e.g., ninety-five (95) seconds) is calculated as twenty percent (20%) of the upper limit. In one example, the heartbeat message is an XMPP ping, which has a pong response (i.e., an IQ get).

The status server exposes an application program interface (API) to allow OSS components access to the connection with the CPE (e.g., script configuration update and TR-069 connection requests), as well as the current status of the CPEs. Using log files, the status server can also expose a history of a given CPE for troubleshooting. The status server, with its up-to-date status knowledge, can now provide useful alarms for a subset of the CPE population. As it knows the CPE's public address (from TLS termination), it can generate an alarm when a threshold of CPEs from the same ISP have lost connectivity. Using values in presence (e.g., the service gateway to which a CPE is connected), an alarm can be generated when a threshold of CPEs are not able to connect to their gateway.

The status server can also send a message that contains a script configuration for a specific CPE. The script configuration data defines scripts that the CPE is to execute (including if they are one time, on demand, etc.) at CPE startup (single user mode), or periodically. Note that the term 'script configuration data' is a broad term that can include any of the identified items discussed herein, or other items that may be of use to a particular CPE, to a service provider, to a network administrator, etc. The hash of the script file can be included along with a relative download uniform resource identifier (URI) (XMPP location). The CPE parses the configuration, and determines if any scripts need to be downloaded. The CPE can reuse the connection to the status server to perform the script downloads using XMPP messages. Once the CPE has the scripts, it executes them and sends the results to the status server as a presence message. The status server uses the information in the original presence to determine the appropriate script configuration for the client.

The status server may also be configured to execute an on-demand script on any given CPE associated with the status server and, further, may have the ability to schedule on-boot script execution for a given CPE associated with the status server. Also, the status server may be configured to see a status of script execution, load any number of scripts into the system for future execution on select CPEs, perform script download for a specific CPE via HTTPS, and/or initiate a sample factory reset script or sample reboot script.

In an embodiment, CPEs are configured with a candidate list of status server URLs. The configured candidate list is the first choice when connecting to a status server. Whenever the candidate list changes (e.g., through updates or network changes), the CPE can select a new primary status server. The CPE can remember which status server is the primary status server and the CPE can attempt to consistently be connected to that particular status server. In an embodiment, CPEs are preconfigured with a default candidate list of status server URLs (typically done at manufacturing time) and the default candidate list may be used as a fallback.

If a connection to the primary status server is terminated or if it fails for any reason (e.g., stream error occurs), the CPE attempts to reconnect to the primary status server. For example, the CPE may wait a period of time before reconnecting and, for each failed attempt to reconnect, the CPE can be configured to wait longer. In one specific example, the period of time to wait is shown in Table 1. (The wait time may be randomly chosen within the defined range.)

TABLE 1

| Connection Retry Count | Wait Range (min-max seconds) |
|---|---|
| 1 | 2-4 |
| 2 | 4-8 |
| 3 | 8-16 |
| 4 | 16-32 |
| 5 (or more) | 32-64 |

After a configurable number of connection attempts (default of five (5)), the CPE may consider the primary status server to be unavailable. The above default number of connection attempts in Table 1 equates to approximately two (2) minutes of time before the CPE attempts to connect to a different status server.

Once the CPE considers the primary status server to be unavailable, the CPE can select a new server based on a server selection algorithm. In an embodiment, unavailable status servers are removed from the candidate status server list (i.e., possible servers it can connect to), before a server selection algorithm is executed. When there are no candidate server URLs (either none have been configured, or all have been removed as they are unavailable), the CPE may use the default candidate server list and follow the same process. If none of the built-in default servers are available, the CPE can start again from its configured list. Once connected, the CPE may reset the retry count to zero (0).

If the CPE is connected to a non-primary status server (the primary status server being the one initially selected for use), the CPE can continue to attempt to connect to the primary status server using a maximum wait range (i.e., thirty-two (32) to sixty-four (64) seconds) between attempts. Once the CPE is successfully connected back to its primary status server, it can close the previous connection (gracefully) to the non-primary status server and then use the primary status server. The process may also be applied when the configured candidate server list is altered and a new primary status server is selected.

The CPE may initiate an attempt to close the TCP connection (e.g., if the CPE is shutting down). The status server should only initiate a TCP connection close operation if there has been an unrecoverable error. The status server can initiate a TCP connection close if it has not received any traffic for a configurable amount of time (e.g., the default amount of time may be five (5) minutes but can be configurable).

Timeouts used by both the CPE and the status server are configurable. By default, the connect timeout may be ten (10) seconds, the read timeout may be ten (10) seconds, and the write timeout may be ten (10) seconds. If a timeout occurs, the connection may be deemed as failed and it can be terminated, no matter if the CPE or status server detects the timeout (i.e., the server initiates the close in this case).

The server selection algorithm can distribute the CPEs evenly across a number of configured and available status servers and, further, provide affinity (stickiness) between the CPE and the status server (while the status server list stays consistent). The algorithm relies on a consistent candidate list, distributed set of CPE identifiers, and a hashing function that produces uniformly distributed results. The server selection algorithm may be used by report module 18. The configured URLs for the status server may contain an IP address or a fully qualified domain name (FQDN). To the CPE, this may be of no importance because the CPE selects an appropriate server URL and then resolves the FQDN if needed. The CPE may use the first resolved address if an FQDN resolves to multiple IP addresses by DNS.

In an embodiment, the server selection algorithm starts with the candidate list of server URLs and treats the order of the candidate list as significant based on configuration (e.g., via TR-069). Any known unavailable servers can be removed from the candidate list by the CPE. The candidate list entries are indexed by the CPE starting at zero (0). The CPE selects a candidate, where this is accomplished by running a hash function over the CPE's identifier (e.g., a TR-069 device identifier). The hash function produces a thirty-two (32) bit number and uniformly distributed values. The CPE now has a numerical value representing its identifier. The CPE reduces the hash value by the size of the candidate list (e.g., using a modulo operation) and the result is the index of the status server URL to use in the candidate list. When initially run (with the complete configured candidate list), the selected status server's URL can be the primary status server for the CPE.

For example, the status server URL list has a size of 4 and can be provided as follows: cmhs1.mso.com/cmhs (0), cmhs2.mso.com/cmhs (1), cmhs3.mso.com/cmhs (2), and cmhs4.mso.com/cmhs (3). The CPE identifier is 00223A-0000391538 and the result of running the hash function on the CPE identifier is 2706254428. Taking the modulo 4 (size of server URL list) of the hash function result (2706254428) gives zero (0). This is the index in the status server URL list to use, thus resulting in cmhs1.mso.com/cmhs being selected as the status server. In another example, now the CPE identifier is 00223A-1050399927. The result of running the hash function on the CPE identifier is 4014641398. Taking the modulo 4 (size of server URL list) of the hash function result (4014641398) gives two (2). This is the index in the status server URL list to use, thus resulting in cmhs3.mso.com/cmhs being selected as the status server.

At any time after the connection has been established (after the presence message), the status server can send a script configuration update message (which the CPE has to parse, download, and execute), or a TR-069 connection request (the CPE needs to attempt to establish the TR-069 management session). The status server is scaled using an in-memory architecture for maintaining status messages and logs (e.g., append-only logs). The status server does not lose meaningful state at restart because the CPEs would reconnect within minutes and provide a current status. In one example, the status server may be scaled to 250,000 CPEs (or more) with heartbeats every 1-2 minutes and native TLS termination on the server itself. Maintaining persistent TCP/TLS connections actually helps to scale the system because the overhead of creating frequent connections is far greater.

The status servers themselves are somewhat stateless. Redundancy may be provided by the CPE being configured with a list of multiple status servers, where the status server (to which to connect) is determined by the selection algorithm. Multiple status servers and the selection algorithm can provide both the required loadbalancing and affinity between a CPE and the status server. The user interface (and other provisioning components such as BFST or UMT) can query the status servers (if necessary) to find which status servers are connected to a particular CPE. The architecture allows the scale of the system to increase by just adding more status servers.

The status server may be configured to track the status of every CPE associated with the status server via constant heartbeats (every 1-2 minutes) and real-time status change notifications. For example, the following status data may be available to the status server, current or last known public IP address of any CPE (UI and logs), current or last known IPSec address of any CPE (UI and logs), current or last known online status of CPE (UI and logs), current or last known CPE service status (UI and logs), current or last known CPE FW version (UI and logs), missed heartbeats and recovery for any CPE (logs), summary status information for all CPEs such as a count of CPEs up or connected, etc.

Turning briefly to potential infrastructure associated with communication system 10, CPEs 12a-f can be associated with clients, customers, or end users wishing to initiate a communication in communication system 10 via some network. The term 'CPE' is inclusive of devices used to initiate a communication, such as a receiver, a computer, a set-top box, an Internet radio device (IRD), a cell phone, a smart phone, a tablet, a personal digital assistant (PDA), or any other device, component, element, or object capable of initiating voice, audio, video, media, or data exchanges within communication system 10. CPEs 12a-f may also be inclusive of a suitable interface to the human user, such as a display, a keyboard, a touchpad, a remote control, or other terminal equipment. CPEs 12a-f may also be any device that seeks to initiate a communication on behalf of another entity or element, such as a program, a database, or any other component, device, element, or object capable of initiating an exchange within communication system 10. In addition, CPEs 12a-f may be any devices that a service provider may deploy within the service provider's own network premises. Data, as used herein in this document, refers to any type of numeric, voice, video, media, or script data, or any type of source or object code, or any other suitable information in any appropriate format that may be communicated from one point to another.

Network 30 represents a series of points or nodes of interconnected communication paths for receiving and transmitting packets of information that propagate through the architecture. Network 30 can offer a communicative interface between servers, data storage elements, user interfaces, and/or CPEs and may be any local area network (LAN), wide area network (WAN), wireless local area network (WLAN), metropolitan area network (MAN), Intranet, Extranet, virtual private network (VPN), or any other appropriate architecture or system that facilitates communications in a network environment. The architecture of the present disclosure may include a configuration capable of transmission control protocol/internet protocol (TCP/IP) communications for the transmission and/or reception of packets in a network. The architecture of the present disclosure may also operate in conjunction with a user datagram protocol/IP (UDP/IP) or any other suitable protocol, where appropriate and based on particular needs.

Status servers 14a-c are network elements that can facilitate the network communication activities discussed herein. As used herein in this Specification, the term 'network element' is meant to encompass routers, switches, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms, communication protocols, and interfaces that allow for the effective exchange of data or information.

In one implementation, status servers 14a-c and/or CPEs 12a-x include software to achieve (or to foster) the network communication activities discussed herein. This could include the implementation of instances of status modules 24 and/or report modules 18 (where these modules interact, perform reciprocating functions, and/or suitably coordinate their activities). Additionally, each of these elements can have an internal structure (e.g., a processor, a memory element, etc.) to facilitate some of the operations described herein. In other embodiments, these network communication activities may be executed externally to these elements, or included in some other network element to achieve the intended functionality. Alternatively, status servers 14a-c and/or CPEs 12a-x may include software (or reciprocating software) that can coordinate with other network elements in order to achieve the network communication activities described herein. In still other embodiments, one or several devices may include any suitable algorithms, hardware, software, components, modules, interfaces, or objects that facilitate the operations thereof.

In operation of an example embodiment, each CPE selects a status server and establishes a TLS connection. The status server terminates the TLS connection and the CPE sends an open stream request. The status server receives the request and responds with its own open stream request. The status server now sends a features message, which includes a SASL EXTERNAL mechanism. The CPE accepts this mechanism by sending an auth message. The status server replies with a success message and the connection is now authenticated. The CPE sends an open stream request and the status server responds with its own open stream request. (Note there was no stream closure preceding this new stream open activity.) The status server now sends a features message, which includes the bind element (for resource binding). The CPE accepts this feature by sending an IQ set containing a bind element with the resource being the interface used by the CPE (e.g., a WAN). The status server accepts this resource binding and the CMHS connection is now established.

After the CMHS connection is established, the first message sent by the CPE is a status update (presence). In an embodiment, the first message can contain a preconfigured list of parameters, which may include a radio status, software version, hardware model, home nodeB (HNB)-gateway (GW) IP address, the assigned IPSec IP address, etc. In other embodiments, the message may contain a different list of parameters selected by an administrator. The status server receives the message and maintains the received information in memory, as well as logging it to a disk. No reply is issued in this particular example.

If the CPE determines that there has not been any traffic on the CMHS connection for a configurable amount of time (e.g., between 95 and 120 seconds), the CPE sends a heartbeat message (e.g., ping) and the connection is maintained with traffic (in order for it to be long-lived). The status server receives the heartbeat message, updates its last receive time for the CPE, logs the heartbeat to a disk, replies with a heartbeat response (pong), and the connection is maintained.

In one example, a status parameter that is included in the status update message has changed on the CPE. As a result, the CPE builds a new status update (within which, the CPE marks that the parameter that has changed (e.g., using a changed attribute)). The CPE also includes the last value reported for the parameter. The status server receives the message and maintains this information in memory, as well as logging it to a disk. No reply would be necessary.

In another example, the status server, via its API, has been instructed to have a CPE execute a script. The instructions are described in the script configuration and the status server finds its open connection to the CPE and sends a script configuration update message. The CPE receives the script configuration update message and then replies with an acknowledgement. The CPE parses the script configuration and determines if any scripts need to be downloaded. If they do, the CPE uses its CMHS connection to perform the download from the status server. The CPE executes the script; afterward, the CPE sends a status update message to the status server that contains the script execution results. The status server receives the message, caches the required data in memory, and logs the message to a disk.

In another example, the status server, via its API, has been requested to request a CPE to create a TR-069 management session with its management server (TR-069 connection request). The status server sends the connection request message to the CPE. The CPE receives the message and replies with an acknowledgement. The CPE then instructs the TR-069 client application to create a management session. The TR-069 client application proceeds to make the TR-069 connection.

In another example, an administrator (e.g., a service provider administrator) has navigated to a user interface and wishes to view the current status of an individual CPE (e.g., the CPE may be identified by the user entering an HNB ID of the CPE). The user looks up the CPE of interest and requests the CPE current status from the status servers. The status servers respond and the results are displayed to the user.

In another example, an administrator seeks to view a status history (server log files) of an individual CPE. The user looks up the CPE of interest and requests the client status history from the status servers. The status servers (using the log files) respond and the results are displayed to the user. In yet another example, an administrator has navigated to the user interface and seeks to view the status server statistics. The user selects the status server of interest and requests the statistics of the status server. The results are returned and displayed to the user. In a different example, an administrator has navigated to the user interface and seeks to view a CMHS deployment summary. The deployment summary contains a breakdown of the reported CPE status including the number of CPEs connected, the number of CPEs with their radio up, the number of clients with radio failures, how many clients have each particular firmware version, etc. The user interface is used to request the summary from all deployed status servers and the results are returned and displayed to the user.

In still another example, an administrator seeks to generate a report of a group of HNBs (i.e., group of CPEs), including if an HNB is online and its current radio status. Previously this required communicating with the HNBs in the group via an auto configuration server (ACS) (e.g., a broadband access center (BAC)). Instead of performing this live data query via TR-069, a query of the status servers associated with the HNBs can return the required data. Hence, the data can be obtained and a report can be generated significantly faster, as there is no need to communicate directly with the HNBs to obtain report details.

In another example activity, an administrator is to perform an upgrade but before the upgrade can occur, a list of target HNBs to upgrade should be generated. Previously, the task was performed by querying for live data for each HNB related to the target HNB-GW. Instead of this live data query via TR-069, the status servers can be queried for the data (e.g., firmware version, device model, if the HNB is connected, the radio status, etc.).

A CPE can report its updated status (via the presence message) to the status server. While processing the status message, the status server may determine (via a script) any group or groups to which the CPE is associated. The group or groups can be dynamically determined by the script. For example, a group may be a radio status failure group, a Femto Gateway group (based on the reported IP address of the configured Femto Gateway), etc.

In a specific example, the group can be a radio failure by HNB-GW group. The status server tracks (per-group) the number of CPEs that have been added to the group in the last interval (where both of these would be configurable). For example, 10 CPEs assigned to HNB-GW 10.10.2.3 have reported radio status "failure." If a configured threshold has been reached, the status server can send an alarm in response to the failures being over the threshold number (e.g., an alarm is sent to each configured simple network management protocol (SNMP) server).

In an embodiment, a connected CPE (i.e., associated with a status server and has a live connection) is dynamically assigned to a number of groups. In this example, the CPE is assigned to an ISP group that is determined via heuristics using the CPE's public IP address. The status server tracks (e.g., per-group) the number of CPEs that have disconnected from the server in a last interval (where the interval would be configurable). For example, one hundred (100) clients that have disconnected in the past thirty (30) seconds may indicate an ISP outage. If a configured threshold has been reached (the threshold may be configurable), the status server may send an alarm (e.g., an alarm may be sent to each configured SNMP server).

A typical XMPP presence message is meant to communicate the presence of a client. Status change messages communicate information about status changes of key services on a CPE, and even key parameters such as firmware version. The exact set of status parameters that are tracked is configurable (typically via TR-069). In one example, the status server terminates XMPP directly (in essence doing a point-to-point XMPP connection). In another example, the connection by the device is first established to an intermediary server in an XMPP infrastructure cloud. The intermediary server then routes the connection to the status server. The status server can be configured to provide aggregated status data for hundreds of CPE connected to the status server via a northbound application program interface (API). Hence, when a particular device needs to report CPE status, it queries the server for cached status data instead of polling.

In an embodiment, there may be duplicate heartbeat connections to two servers via different network interfaces (e.g., CPE 12*f* is connected to status servers 14*a* and 14*c*). The same peer query applies whenever there is server redundancy. For example, CPE 12*f* may lose connection to status server 14*a* and connection to status server 14*c*. However, before status server 14*a* sends an alarm, it checks with status server 14*c* to determine if status server 14*c* is still connected to CPE 12*f*. In this instance, before any alarms are sent by the status server to the OSS due to an unconnected CPE, both servers consult with each other. This allows for a graceful switchover between servers (without alarms) and support for scheduled maintenance activities without generating alarms. CPEs may also assist in avoiding redundant alarms by performing graceful fail-back and communicating the status of a last heartbeat to a potentially new server. This aids the new server after switchover to determine if alarms need to be sent.

Figure 2A:
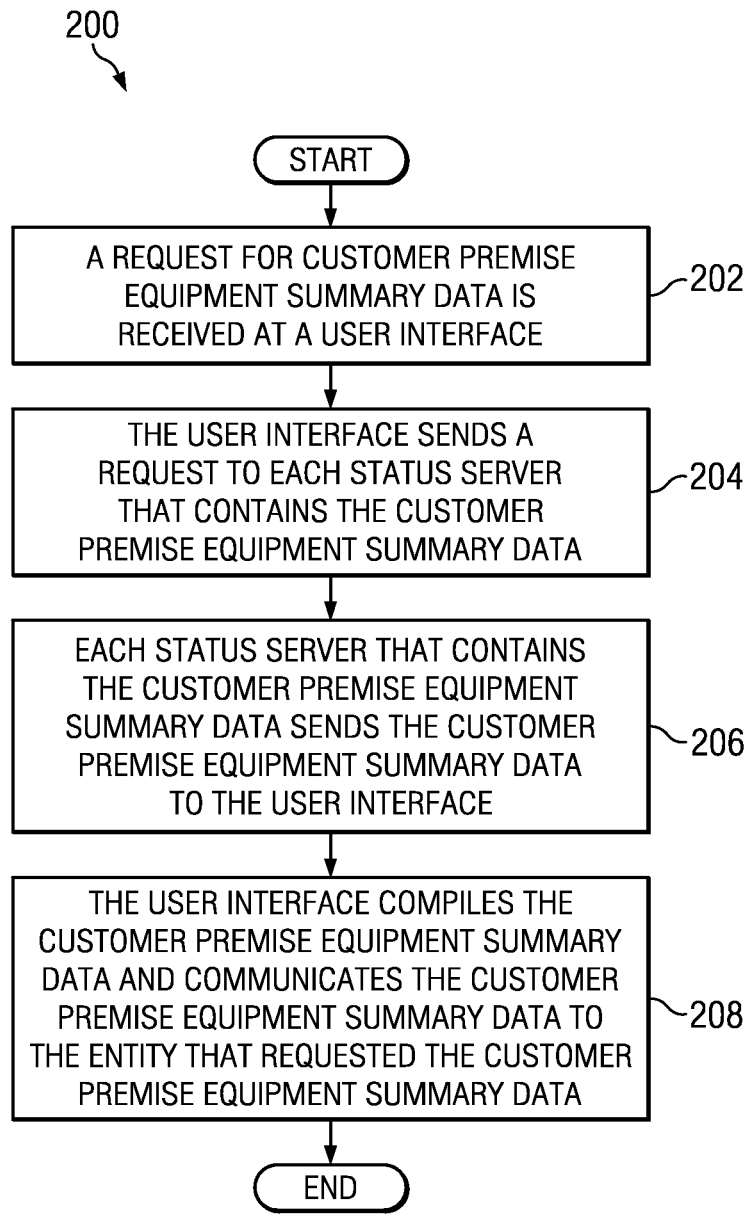
FIG. 2A is a simplified flowchart illustrating potential operations associated with the communication system in accordance with one embodiment of the present disclosure.

Turning to FIG. 2A, FIG. 2A is a simplified flowchart 200 illustrating one potential operation associated with the present disclosure. In an embodiment, at 202, a request for CPE summary data is received at a user interface. For example, an administrator may employ user interface 16 to request summary data for one or more CPEs 12*a-f*. At 204, the user interface sends a request to each status server that contains the CPE summary data. For example, user interface 16 may send the request for summary data to each status server 14*a-c* that contains the summary data. More specifically, if summary data for only CPEs 12*a-f* is desired, then a request would only be sent to status server 14*a*. In another example, the request may also be sent to redundant status servers that are associated with CPEs 12*a-f*.

At 206, each status server that contains the CPE summary data sends the CPE summary data to the user interface. At 208, the user interface compiles the CPE summary data and communicates the CPE summary data to the entity that requested the CPE summary data. For example, if an administrator requested the CPE summary data, then user interface 16 may send, display, or otherwise make available the summary data to the administrator. If a third party (i.e., network device 28) requested the CPE summary data and is authorized to receive the summary data, then user interface 16 may send or otherwise make available the summary data to the third party. In an embodiment, network device 28 may directly request the data from status servers 14*a-c*.

Figure 2B:
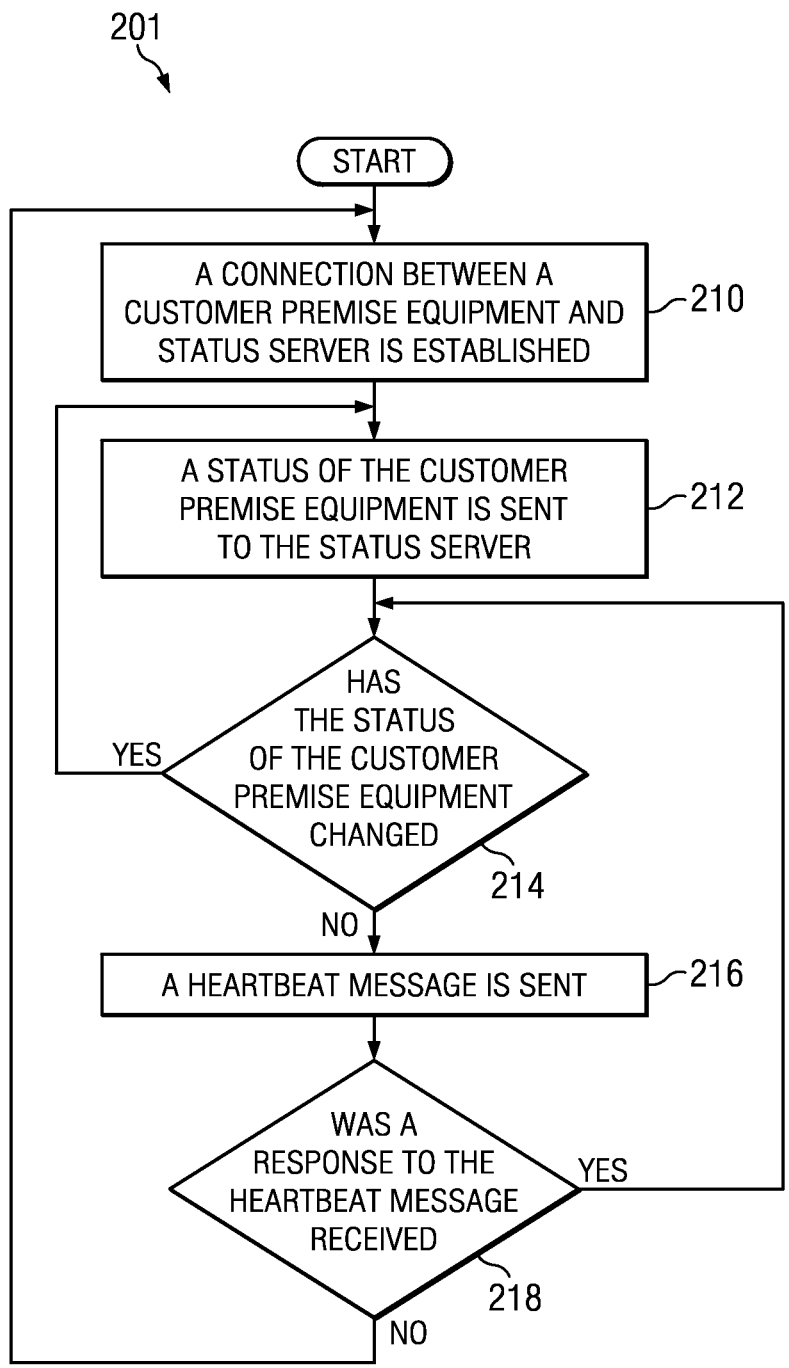
FIG. 2B is another simplified flowchart illustrating potential operations associated with the communication system in accordance with one embodiment of the present disclosure.

Turning to FIG. 2B, FIG. 2B is a simplified flowchart 201 illustrating one potential operation associated with the present disclosure. In an embodiment, at 210, a connection between a CPE and a status server is established. For example, a connection between CPE 12*a* and status server 14*a* may be established. At 212, a status of the CPE is sent to the status server. At 214, the system determines if the status of the CPE has changed. For example, report module 18 may determine if the status of CPE 12*a* has changed. If the status of the CPE has changed, then a status of the CPE is sent to the status server, as illustrated in 212. If the status of the CPE has not changed, then a heartbeat message is sent, as illustrated in 216. For example, report module 18 in CPE 12*a* may send a heartbeat message to status server 14*a*. Alternatively, status server 14*a* may send a heartbeat message to report module 18 in CPE 12*a* if data is not received for a predetermined amount of time. At 218, the system determines if a response to the heartbeat message was received. If a response to the heartbeat message was received, then the system determines if the state of the CPE has changed, as illustrated in 214. If a response to the heartbeat message was not received, then a connection between the CPE and the status server is established, as illustrated in 210.

Figure 2C:
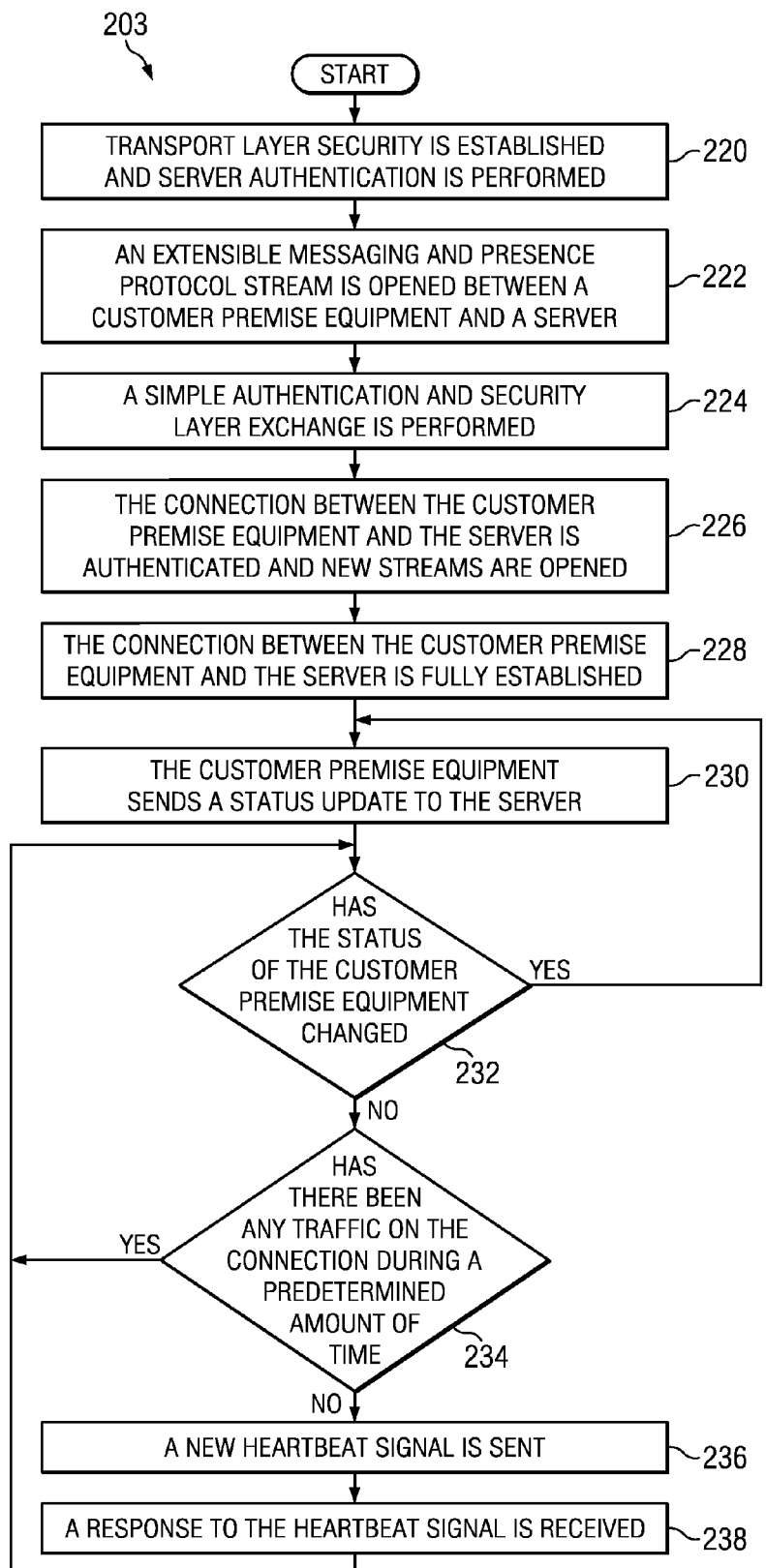
FIG. 2C is another simplified flowchart illustrating potential operations associated with the communication system in accordance with one embodiment of the present disclosure.

Turning to FIG. 2C, FIG. 2C is a simplified flowchart 203 illustrating one potential operation associated with the present disclosure. In an embodiment, at 220, a transport layer security (TLS) is established and server authentication is preformed. For example, TLS and server authentication (i.e., mutual authentication) may be performed with respect to CPE 12a and status server 14a. At 222, an XMPP stream is opened between a CPE and a server. For example, an XMPP stream may be created between status server 14a and CPE 12a. At 226, the connection between the CPE and the server is authenticated and new streams are opened. At 228, the connection between the CPE and the server is fully established. At 230, the CPE sends a status update to the server. At 232, the system can determine if the status of the CPE has changed. If the status of the CPE has changed, then the CPE can send a status update to the server. If the status of the CPE has not changed, then the system determines if there has been any traffic during a predetermined about of time, as illustrated in 234. If there has been any traffic during the predetermined about of time, then the system determines if the status of the CPE has changed, as illustrated in 232. If there has not been any traffic during the predetermined about of time, then a heartbeat signal is sent, as illustrated in 236. At 238, a response to the heartbeat signal is received.

Figure 3:
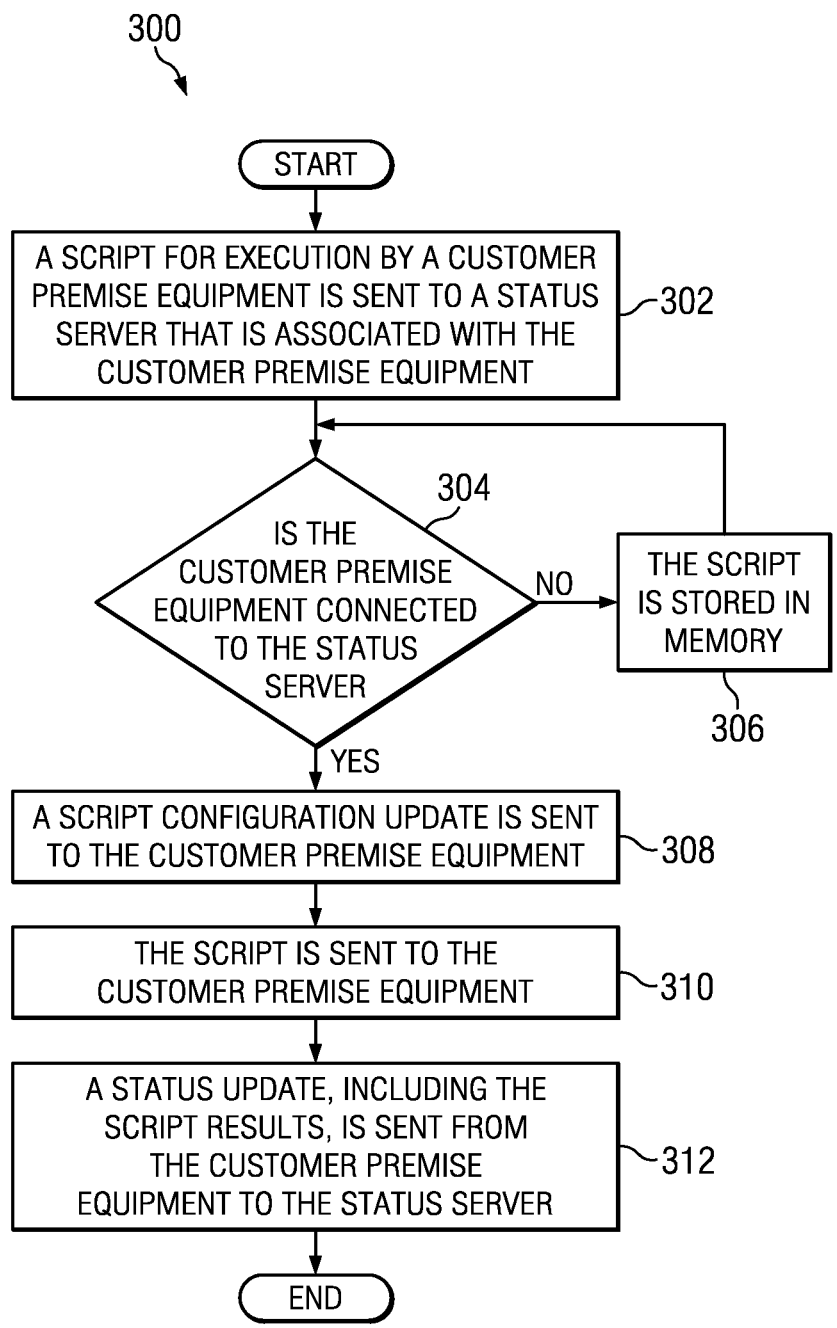
FIG. 3 is another simplified flowchart illustrating potential operations associated with the communication system in accordance with one embodiment of the present disclosure.

Turning to FIG. 3, FIG. 3 is a simplified flowchart 300 illustrating one potential operation associated with the present disclosure. At 302, a script for execution by a CPE is sent to a status server that is associated with the CPE. For example, a user interface or network device 28 may send a script for execution by CPE 12a to status server 14a. At 304, the system determines if the CPE is connected to the status server. If the CPE is not connected to the status server, then the script is stored in memory, as illustrated in 306. For example, if CPE 12a is not connected to status server 14a, then the script may be stored in memory 22a or 22c. In an embodiment, the script is stored on a disk regardless of the existing connection to the CPE.

If the CPE is connected to the status server, then a script configuration update is sent to the CPE, as illustrated in 308. In an embodiment, the CPE may provide only two valid responses to the script configuration update, IQ result and stream error. If the CPE sends a stream error, the CPE may terminate the connection and then reestablish the session with the status server.

At 310, the script is sent to the CPE. In an embodiment, a script may be marked for execution at startup. A startup script is executed in two situations. First, when the CPE first starts (and the script configuration is persistent from a previous session); and second, upon receiving a script configuration from the status server after an initial status message was sent. At 312, a status update, including the script results, is sent from the CPE to the status server. Once the status update and the script results are stored in status server 14a, then user interface 16 and/or network device 28 may access the status and script results.

Figure 4:
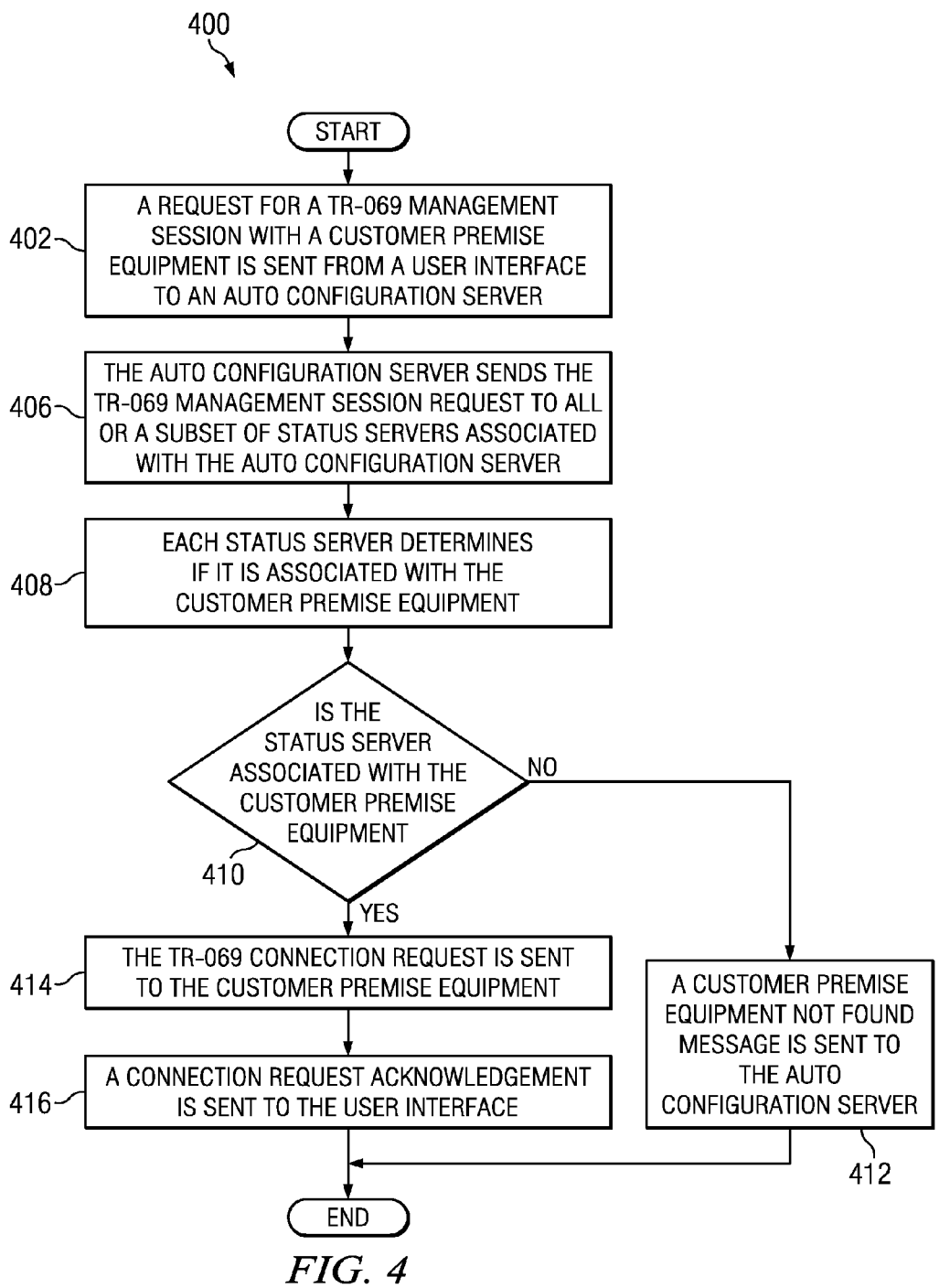
FIG. 4 is another simplified flowchart illustrating potential operations associated with the communication system in accordance with one embodiment of the present disclosure.

Turning to FIG. 4, FIG. 4 is a simplified flowchart 400 illustrating one potential operation associated with the present disclosure. At 402, a request for a management session (e.g., a TR-069 management session) with a CPE is sent from a user interface to an ACS. At 406, the ACS sends the management session request to all, or to a subset of, status servers associated with the ACS. In an embodiment, the request is sent in parallel to each status server. At 408, each status server determines if it is associated with the CPE. At 410, the system determines if the status server is associated with the CPE. If the status server is not associated with the CPE, then a CPE not found message is sent to the ACS, as illustrated in 412. If the status server is associated with the CPE, then the connection request for the management session is sent to the CPE, as illustrated in 414. At 416, a connection request acknowledgment is sent to the user interface.

Figure 5:
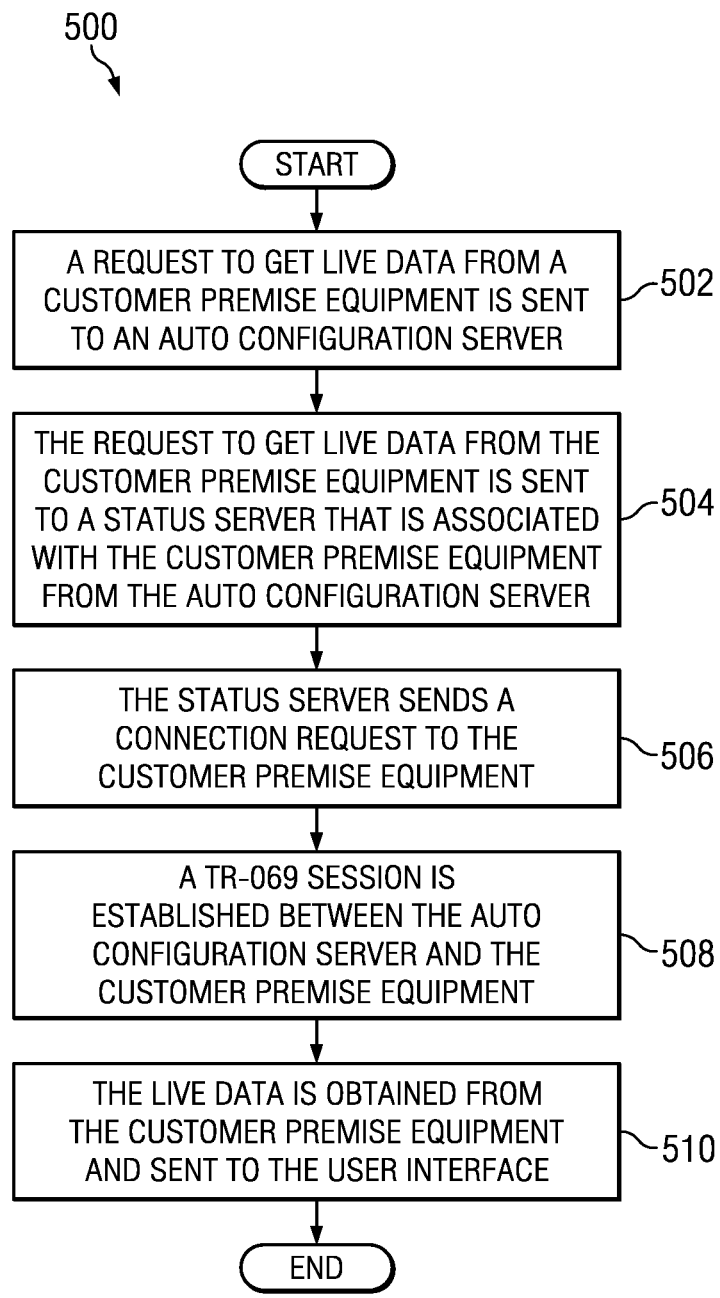
FIG. 5 is another simplified flowchart illustrating potential operations associated with the communication system in accordance with one embodiment of the present disclosure.

Turning to FIG. 5, FIG. 5 is a simplified flowchart 500 illustrating one potential operation associated with the present disclosure. At 502, a request to retrieve live data from a CPE is sent to an ACS. At 504, the request to retrieve live data from the CPE is sent to a status server that is associated with the CPE from the ACS. At 506, the status server sends a connection request to the CPE. At 508, a TR-069 session is established between the ACS and the CPE. At 510, the live data is obtained from the CPE and sent to the user interface.

Figure 6:
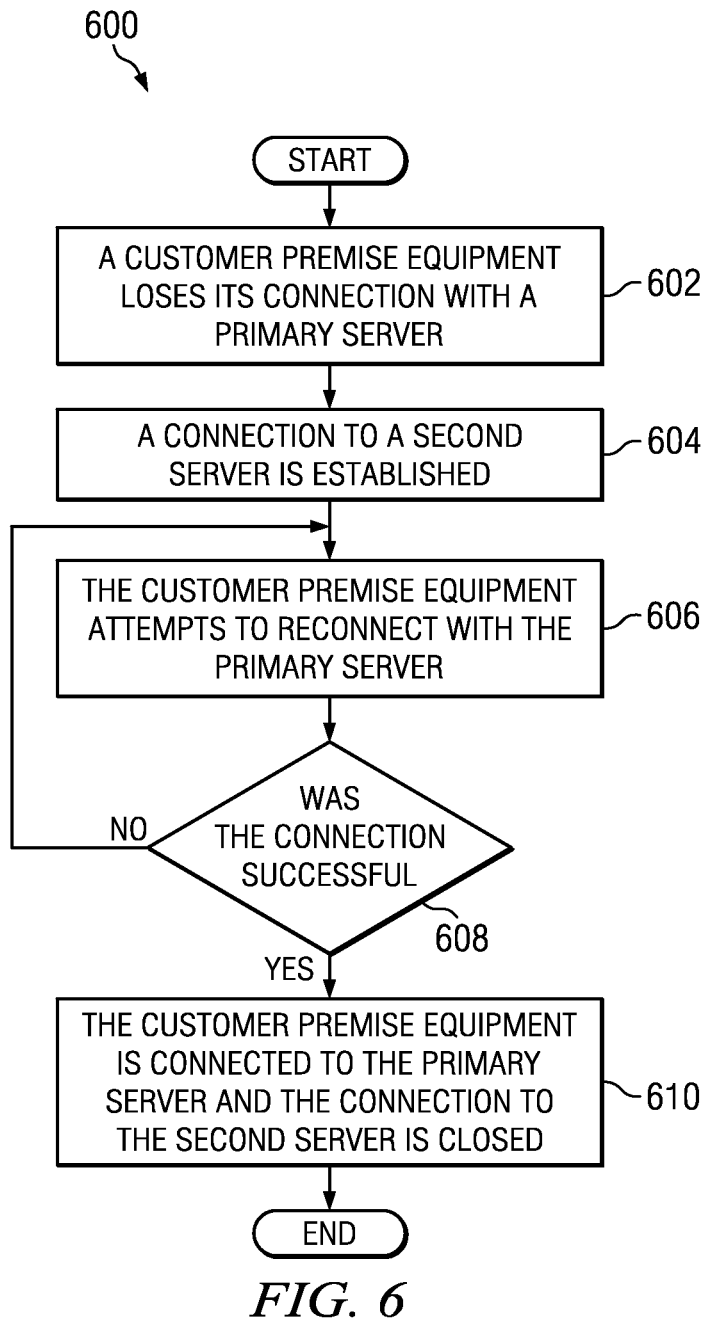
FIG. 6 is another simplified flowchart illustrating potential operations associated with the communication system in accordance with one embodiment of the present disclosure.

Turning to FIG. 6, FIG. 6 is a simplified flowchart 600 illustrating one potential operation associated with the present disclosure. At 602, a CPE loses its connection with a primary server. At 604, a connection to a second server is established. At 606, the CPE attempts to reconnect with the primary server. At 608, the system determines if the connection was successful. If the connection was not successful, then the CPE attempts to reconnect with the primary server, as illustrated in 606. If the connection was successful, then the CPE is connected to the primary server and the connection to the secondary server is closed, as illustrated in 620.

Note that in certain example implementations, the functions outlined herein to contact and maintain status of managed devices may be implemented in logic encoded in one or more non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1] can store data used for the operations described herein. This includes the memory element being able to store instructions (e.g., software, logic, processor instructions, etc.) that can be executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, communication system 10 may be applicable to other protocols and arrangements. Moreover, the present disclosure is equally applicable to various technologies, aside from CPE architectures, as these have only been offered for purposes of discussion. Along similar lines, communication system 10 can be extended to any communications involving network elements, where the present disclosure is explicitly not confined to TR-069 activities.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    establishing a plurality of persistent connections with a plurality of devices at a server, wherein each of the plurality of devices are dynamically assigned to at least one group;
    sending script configuration data to at least one device included in the plurality of devices, after a persistent connection has been established with the at least one device, wherein the script configuration data defines one or more scripts that the at least one device is to execute;
    encoding messages communicated on the persistent connections using an extensible messaging and presence protocol (XMPP), wherein the persistent connections include an XMPP upstream connection and an XMPP downstream connection;
    receiving presence data associated with the plurality of devices;
    responding to heartbeat messages provided by the plurality of devices;
    receiving a status change notification from a particular one of the devices; and
    updating status data and heartbeat data for the particular one of the devices.

2. The method of claim 1, wherein the persistent connections are secured using transport layer security (TLS).

3. The method of claim 1, further comprising:
    communicating a status for the particular device from the server in response to a request status update from a user interface.

4. The method of claim 1, further comprising:
    communicating an alarm from the server when a status change notification satisfies a condition or the heartbeat message is not received after a predetermined amount of time.

5. The method of claim 1, further comprising:
    consulting a redundant server before an alarm is communicated when a heartbeat message is not received from the particular device after a predetermined amount of time.

6. The method of claim 1, wherein the presence data includes a preconfigured list of parameters about a particular set of services for the particular device.

7. The method of claim 1, further comprising:
    caching the presence data in memory for access by an operations support system (OSS).

8. The method of claim 1, wherein the server exposes an application program interface (API) to allow an OSS access to a particular one of the persistent connections with the particular device for providing script configuration data.

9. The method of claim 1, further comprising:
    determining a threshold of the plurality of devices have lost connectivity; and
    providing an alarm to indicate a condition reflective of the lost connectivity.

10. The method of claim 1, wherein at least a portion of the plurality of devices use a TR-069 protocol.

11. The method of claim 1, wherein the status change notification indicates that the particular one of the devices changed parameter values or completed a script execution.

12. The method of claim 1, further comprising:
    determining a threshold of the plurality of devices from a same internet service provider have lost connectivity, wherein the server knows each of the plurality of devices' Internet Protocol address from transport layer security termination; and
    providing an alarm to indicate a condition reflective of the lost connectivity.

13. The method of claim 1, further comprising:
    parsing the script configuration data by the at least one device to determine if any scripts need to be downloaded.

14. The method of claim 13, further comprising:
    using a persistent connection associated with the at least one device to download a script, wherein the script is downloaded using XMMP messages.

15. Logic encoded in one or more non-transitory media that includes instructions for execution and when executed by a processor is operable to perform operations, comprising:

establishing a plurality of persistent connections with a plurality of devices at a server, wherein each of the plurality of devices are dynamically assigned to at least one group;

sending script configuration data to at least one device included in the plurality of devices, after a persistent connection has been established with the at least one device, wherein the script configuration data defines one or more scripts that the at least one device is to execute;

encoding messages communicated on the persistent connections using an extensible messaging and presence protocol (XMPP), wherein the persistent connections include an XMPP upstream connection that opens after transport layer security authentication has occurred and an XMPP downstream connection;

receiving presence data associated with the plurality of devices;

responding to heartbeat messages provided by the plurality of devices;

receiving a status change notification from a particular one of the devices; and updating status data and heartbeat data for the particular one of the devices.

16. The logic of claim 15, wherein the persistent connections are secured using transport layer security (TLS).

17. The logic of claim 15, the operations further comprising:

caching the presence data in memory for access by an operations support system (OSS), wherein the presence data includes a preconfigured list of parameters about a particular set of services for the particular device.

18. The logic of claim 15, the operations further comprising:

determining a threshold of the plurality of devices have lost connectivity; and providing an alarm to indicate a condition reflective of the lost connectivity.

19. An apparatus, comprising:

a memory element configured to store instructions;

a processor coupled to the memory; and a status module, wherein the processor is operable to execute the instructions such that the apparatus is configured for:

establishing a plurality of persistent connections with a plurality of devices at a server, wherein each of the plurality of devices are dynamically assigned to at least one group;

sending script configuration data to at least one device included in the plurality of devices, after a persistent connection has been established with the at least one device, wherein the script configuration data defines one or more scripts that the at least one device is to execute;

encoding messages communicated on the persistent connections using an extensible messaging and presence protocol (XMPP), wherein the persistent connections include an XMPP upstream connection and an XMPP downstream connection;

receiving presence data associated with the plurality of devices;

responding to heartbeat messages provided by the plurality of devices;

receiving a status change notification from a particular one of the devices; and updating status data and heartbeat data for the particular one of the devices.

20. The apparatus of claim 19, wherein the persistent connections are secured using transport layer security (TLS).

\* \* \* \* \*